Dec. 1, 1942.   J. M. TOWLER ET AL   2,303,590
PUMP RELIEF VALVE
Filed Aug. 21, 1941

Patented Dec. 1, 1942

2,303,590

UNITED STATES PATENT OFFICE 2,303,590

PUMP RELIEF VALVE

John Maurice Towler and Frank Hathorn Towler, Yorkshire, England

Application August 21, 1941, Serial No. 407,722
In Great Britain June 20, 1940

3 Claims. (Cl. 137—53)

This invention relates to relief valves for liquid discharging pumps of the kind which function automatically to release liquid from the delivery main of the pump when the pressure in said main attains a predetermined pressure.

In relief valves of the above kind now in common use the valve member is held closed by a spring which is adjusted so that the valve will open and compress the spring when the liquid acting on the opposite side of the valve attains a predetermined maximum pressure.

The valve member in such relief valves is usually of the mitre type and one of the disadvantages of this valve is that it takes considerable pressure to lift it off its seat and once it is off its seat there is usually a fall in pressure. Also, as the orifice is in the form of a very fine annulus, the slightest bit of grit will cause a variation in pressure and may damage the seat. Furthermore, mitre type valves are inclined to chatter on the seat, which also causes additional wear. Finally, as the orifice is in the form of a fine annulus, the velocity of flow through the seat is very high and causes undue wear.

An object of the invention is to provide a relief valve which will be durable in service and not liable to choke up.

A further object of the invention is attained by a construction in which the valve member consists of a piston operated plunger and the pumped liquid is permitted to have constant access to opposing and differential piston areas simultaneously and in such manner that when the valve has been opened the effective pressure tending to open the valve is increased.

The first-mentioned object is attained by employing as the valve member a plunger which is a sliding fit in a cylindrical bush or seat and, for the purpose of the relief outlet, providing such plunger with a long constricted passage, a normally closed end of which is opened by being progressively uncovered as the spindle is moved longitudinally by its operating piston.

Broadly the present invention consists of a relief valve of the piston operated plunger type for pumps wherein the pumped liquid is permitted to have constant access to opposing and differential piston areas simultaneously in such manner that the pressure of the liquid on the larger piston area tends to open the valve against the combined pressure of a spring and the pressure of the liquid acting against the lesser piston area, and the opening of the valve produces a reduction in the pressure of the liquid acting against the lesser piston area relatively to the pressure of the liquid acting against the larger piston area, whereby the effective pressure tending to open the valve is thereby increased.

A relief valve constituting a preferred embodiment of the invention broadly comprises a valve plunger having a normally closed valve orifice, a spring arranged to resist movement of said plunger to open said valve orifice, a piston slidably mounted within a cylinder and operatively connected to the valve plunger, the area on one side of said piston being greater than the area on the opposite side of the piston, orifices serving to permit the pumped liquid to have constant access to both sides of the piston simultaneously, on the side of greater area to effect an opening movement of the valve plunger to permit liquid to flow from the interior of the cylinder on the side of the piston of lesser area out through the valve orifice, and on said lesser area side to act with the spring to oppose said opening movement, the orifice for admitting pressure liquid to said lesser area side of the piston having an area which is predetermined so that the escape of liquid from the cylinder on the lesser area side of the piston through the valve orifice will produce a reduction in the pressure of the liquid acting against such lesser piston area and a corresponding increase in the effective pressure tending to open the valve member partially or wholly to compensate for the increased load of the spring due to the compression effected by the opening movement of the plunger.

It is preferred that the relief outlet for the exhaust liquid be a constricted passage which is closed at one end and formed by helically grooving the exterior of the said valve plunger over a portion of its length, the normally closed end of said passage being opened by progressively uncovering the groove as the plunger is moved longitudinally by the operating piston to provide a discharge or valve orifice for the exhaust liquid of correspondingly increasing area.

In order that the invention may be clearly understood and carried into effect a relief valve according to the above described embodiment will now be described, by way of example, by aid of the accompanying drawing in which.

Figure 1:
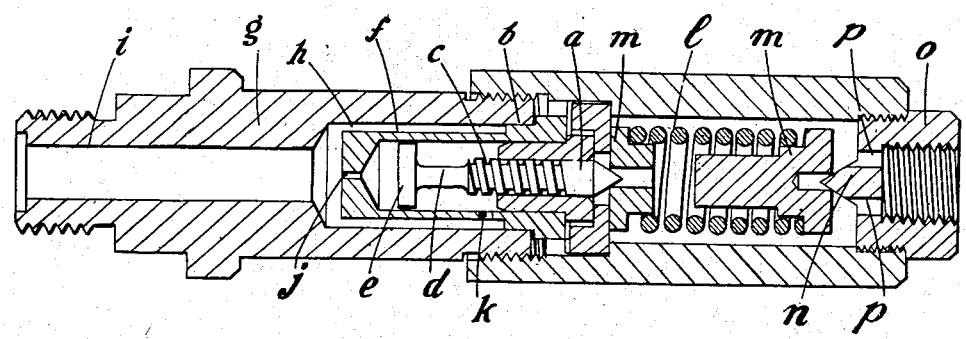
Fig. 1 is a longitudinal section through the relief valve with the valve member in the closed position.
Figure 2:
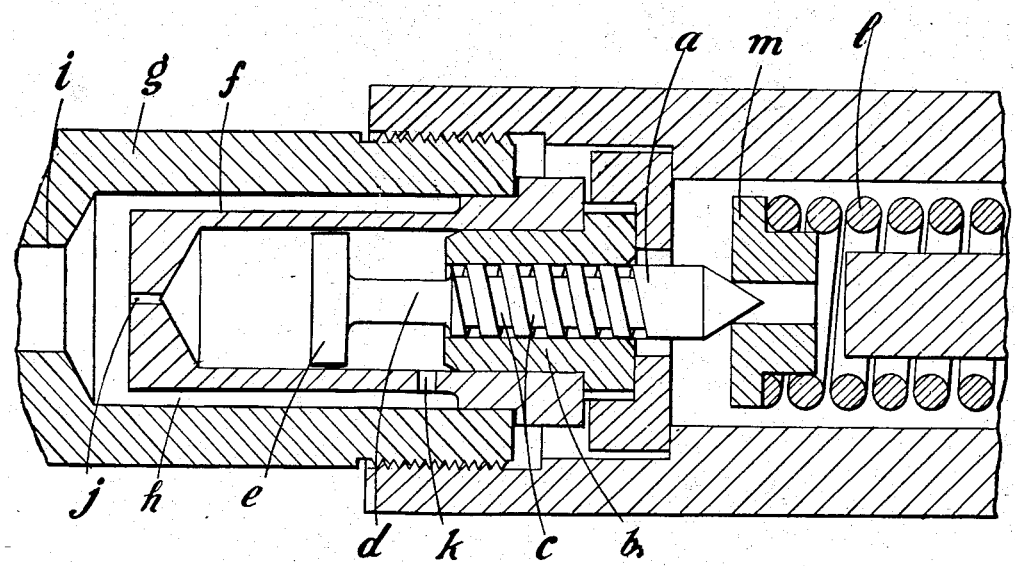
Fig. 2 is a similar view but showing the valve member in an open position.

In the relief valve illustrated the valve member consists of a conical nosed plunger $a$ which has a sliding fit in a cylindrical bush or seat $b$ and is cut with a groove $c$ in the form of a helix which groove provides a long and constricted passage and extends along the plunger from the rear end to a point short of the forward end of the same so that in the inoperative position of the valve shown in Fig. 1 the forward end of the passage is closed by the covering or enclosing wall of the bush $b$.

The plunger $a$ is extended rearwardly to provide a piston rod $d$ on the end of which is formed or mounted a piston $e$. This piston is of larger diameter than the plunger $a$ and is a close fit within a cylinder $f$ which in turn is supported by its forward end in a spaced relationship within a casing member $g$ so as to provide an annular space $h$ around the cylinder which is open to the pump discharge by way of the inlet $i$.

The pressure liquid within the annular space $h$ is permitted to have constant access to the spaces on both sides of the piston, to the space at the rear or side of largest piston area by way of the axial orifice $j$ and to the annular space on the opposite side or lesser piston area by way of the radial orifice $k$.

When the valve is closed the pressure per unit of area on both sides of the piston will be the same and therefore the force tending to open the valve is that due to the pressure acting on the effective area of the valve plunger. This pressure is resisted by a spring $l$ which is supported by and between a pair of spring pads $m$. These pads in turn are supported so as to be self-aligning, one by the conical nose of the valve plunger, and the other by an equivalent conical projection $n$ on the inside face of a fitting $o$ constituting an exhaust pipe union.

When the pressure within the cylinder $f$ has risen to a predetermined figure the valve plunger and its piston will be moved to the right, thus compressing the spring $l$ and uncovering the forward end of the helical groove $c$. The uncovered part of the groove thus provides a valve orifice which increases in area as the groove continues to become uncovered and allows liquid from the annular space on the right of the piston to escape along the helical passage into the space wherein is situated the spring $l$, and out through exhaust passages $p$ in the exhaust pipe union $o$.

In consequence of the above opening of the valve the liquid from the annular space $h$ surrounding the cylinder $f$ will continue to flow into the annular space on the right of the piston through the radial orifice $k$, with the result that the pressure on the annular side of the piston drops owing to the pressure difference across orifice $k$ so that it is less than the pressure which exists on the opposite or rear side of the piston which remains at the pressure of the liquid within the annular space $h$. This, therefore, tends to increase the force which effects the opening of the valve.

By suitably proportioning the area of the piston and the area of the orifice $k$, this increase in force tending to open the valve may be made almost equal to the increase in the spring load due to the compression of the spring $l$ by the opening movement of the valve plunger.

As aforementioned the helical groove in the valve plunger provides a long constricted passage through which the liquid has to pass before it reaches the uncovered end or valve orifice and consequently the greater part of the discharge pressure may be taken up in passing along this passage before it reaches the valve orifice. For instance, supposing the valve is designed to blow off at 1200 lbs. per square inch, then the resistance of the spiral groove may be equivalent to 800 lbs. per square inch and the valve orifice 400 lbs. per square inch when the full discharge of the pump is being delivered through the relief valve. On the other hand, if some of the delivery of the pump is being used to operate a hydraulic cylinder, then only a part of the delivery of the pump has to be discharged through the relief valve and the pressure is automatically regulated by the restriction of the valve orifice.

It should be understood that the above figures as to the proportion of the pressure which is taken up by the helical passage and the valve orifice are only given by way of explanation and are not intended to limit the invention to any such proportion.

One of the advantages of the above construction is that, if any grit gets into the helical passage, it tends to be blown out and clear itself, also the passage tends to ensure that the plunger is well lubricated in the bore of the seat, so that it does not stick. It will be understood, of course, that this valve is intended primarily for pumps which are pumping oil or other liquid having the qualities of a lubricant.

Having now particularly described and ascertained the nature of our said invention and in what manner the same is to be performed, we declare that what we claim is:

1. A relief valve for pumps and the like, including a pressure liquid chamber, a piston having opposed surfaces of differential areas disposed therein for reciprocating movement, said chamber having an axial bore at one end, a plunger rigid with said piston mounted in said bore, said plunger having a head embodying a conical nose, said head being formed to function as a seal for said bore, spring means in engagement with said nose portion for urging said head into bore-sealing position, means at each end of said chamber for constantly admitting pressure liquid to the opposite surfaces of said piston whereby the differential pressure urges the plunger head to open position, said spring means under normal operating conditions maintaining said plunger head in bore-sealing position, said piston being responsive to excessive pressure on its surface of greater area, to urge said plunger outwardly of said bore and dislocate said head from sealing position, in opposition to said spring means, and means formed on the periphery of said plunger adapted to cooperate with the surrounding wall of the bore to provide an elongated constricted passage between that portion of said chamber in which the pressure liquid is effective upon the piston surface of lesser area and the outer end of said bore, when the plunger is actuated in opposition to said spring means, as aforesaid, said constricted passage-forming means consisting of a helical groove between the head of the plunger and said piston, the convolutions of which may be progressively projected beyond the end of the bore, to increase the area of discharge of said passage in response to the differential pressure of the liquid acting upon said piston, the movement of the liquid through said passage contributing to the reduction of pressure on the side of the piston of lesser area.

2. A relief valve, including a casing provided at one end with a passage connectable to a pump or the like, a cylinder forming a pressure liquid chamber located in said casing, one end thereof being in spaced relation to said passage, the wall of said cylinder being spaced from the surrounding wall of said casing, a member for closing the other end of said cylinder provided with an axial bore, a plunger mounted for reciprocable movement within said bore formed with a head having a conical nose portion, said head being adapted to function as a seal for said bore, a piston having opposed surfaces of differential areas connected to said plunger reciprocable within said chamber, spring means in engagement with the nose of said plunger for urging the head thereof into bore-sealing position, means at each end of said cylinder for constantly admitting pressure liquid to the chamber therein, whereby the differential pressure of the liquid acting on said piston tends to open said plunger against the action of said spring, and means for transferring pressure liquid from that portion of said chamber in which it is effective upon the piston surface of lesser area to said casing externally of the head of said plunger, said means consisting of a helical groove formed on the periphery of said plunger and extending from the head thereof to a point in spaced relation to said piston, adapted to cooperate with the wall of said bore to form a passage between said chamber portion and the casing externally of the head of the plunger, when said plunger is actuated in opposition to said spring means, under the influence of a pressure liquid differential effective upon the piston surface of larger area to induce conjoint movement of said piston and said plunger, the continuing movement of the plunger progresssively increasing the area of the outlet of said passage, as the convolutions of the helical groove are progressively projected beyond the end of the bore, the portion of said helical groove adjacent the plunger head under normal operating conditions being wholly contained within the area of said bore and the head of the plunger being seated within the bore.

3. A relief valve for pumps and the like, including a pressure liquid chamber, a piston having opposed surfaces of differential areas disposed for reciprocation within said chamber, means for admitting pressure fluid to opposite sides of said piston, said chamber being provided with an axial bore at one end, a plunger connected to said piston for conjoint movement, said plunger being reciprocable within said bore, and embodying a head adapted to function as a seal for said bore, spring means for urging said plunger toward its bore-sealing position and means for transferring pressure liquid from said chamber through said bore to a point beyond said plunger head, in response to the movement of the plunger in opposition to said spring means, said pressure liquid transferring means consisting of a helical groove of a length approximately that of said bore formed on the periphery of said plunger, adapted to cooperate with the surrounding wall of said bore to form a constricted pressure reducing passage between said chamber and the head of the plunger, the effective area of the outlet from said passage increasing in proportion to the movement of the head of the plunger outwardly of the end of the bore in response to the differential pressure of the liquid acting on said piston, in opposition to said spring, the movement of the liquid within said passage contributing to the reduction of pressure on the side of the piston of lesser area.

JOHN MAURICE TOWLER.
FRANK HATHORN TOWLER.